(12) United States Patent
Chen et al.

(10) Patent No.: US 8,132,455 B2
(45) Date of Patent: Mar. 13, 2012

(54) ROBUST MICROMACHINED THERMAL MASS FLOW SENSOR WITH DOUBLE SIDE PASSIVATED POLYIMIDE MEMBRANE

(76) Inventors: Chih-Chang Chen, Cupertino, CA (US); Gaofeng Wang, San Jose, CA (US); Liji Huang, San Jose, CA (US); Yahong Yao, Sunnyvale, CA (US)

( * ) Notice: Subject to any disclaimer, the term of this patent is extended or adjusted under 35 U.S.C. 154(b) by 140 days.

(21) Appl. No.: 12/538,337

(22) Filed: Aug. 10, 2009

(65) Prior Publication Data

US 2011/0030468 A1     Feb. 10, 2011

(51) Int. Cl.
*G01F 1/68* (2006.01)
(52) U.S. Cl. .................................... 73/204.26
(58) Field of Classification Search ............... None
See application file for complete search history.

(56) References Cited

U.S. PATENT DOCUMENTS

| | | | | |
|---|---|---|---|---|
| 5,243,858 A * | 9/1993 | Erskine et al. | ............. | 73/204.26 |
| 5,263,380 A * | 11/1993 | Sultan et al. | ................ | 73/204.26 |
| 5,321,983 A * | 6/1994 | Nagata | ........................ | 73/204.18 |
| 5,452,610 A * | 9/1995 | Kleinhans et al. | ......... | 73/204.26 |
| 5,515,714 A * | 5/1996 | Sultan et al. | .................. | 73/25.01 |
| 6,378,365 B1 * | 4/2002 | Tu | ............... | 73/204.26 |
| 6,536,274 B1 * | 3/2003 | Zushi et al. | ................ | 73/204.26 |
| 6,981,410 B2 * | 1/2006 | Seki et al. | .................. | 73/204.26 |

* cited by examiner

*Primary Examiner* — Harshad Patel

(57) ABSTRACT

A micromachined thermal mass flow sensor comprises a high mechanical strength polyimide film as a supporting layer of suspending membrane. The polyimide film provides superior thermal insulating properties to reduce the power consumption of device. Due to the tendency of humidity absorption, the polyimide suspending membrane is double side passivated on both top and bottom surfaces to sustain its long term stability from rush and humid working environment. A thin layer of silicon dioxide deposited by plasma enhanced chemical vapor deposition is overlaid between the silicon nitride and polyimide film to enhance the adhesion property of passivation layers to polyimide surface. With such embodiments, a sturdy and robust micromachined thermal mass flow sensor with high measurement accuracy could be formed.

6 Claims, 3 Drawing Sheets

Figure 1:
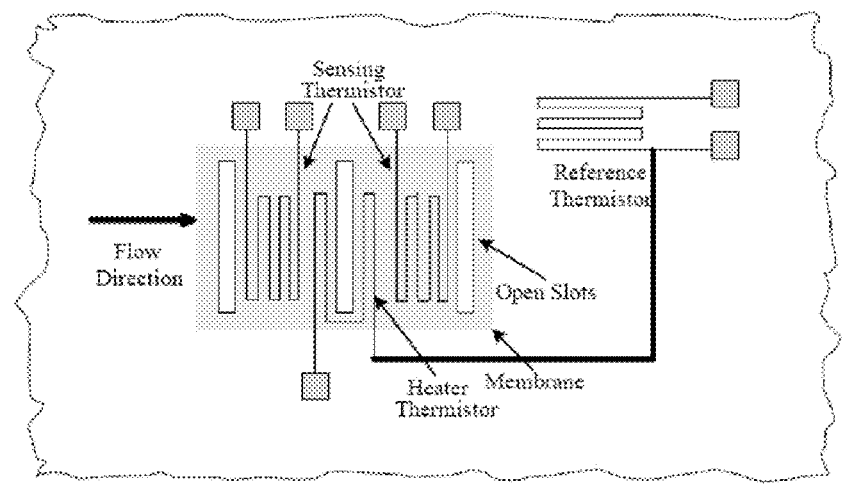

ROBUST MICROMACHINED THERMAL MASS FLOW SENSOR WITH DOUBLE SIDE PASSIVATED POLYIMIDE MEMBRANE

BACKGROUND OF THE INVENTION

1. Field of the Invention

The present invention discloses the details of robust micromachining devices for measuring mass flow rate in a gas or liquid medium according to the preamble of the independent claims. It concerns mass flow sensor in a micro-structure forms which are made of micromachining approach and methods of manufacture. The present micromachining flow sensor is built on a suspending membrane based on polyimide materials.

Unlike the conventional micro-fabricated devices were generally susceptible with the disadvantages of vulnerability and fragility in an inhospitable surroundings, the present invention provides robust micromachining devices with capabilities to operate under complementary harsh environments.

2. Description of the Related Art

Various thermal mass flow meters have been heretofore developed and commercially available on the market. Over the past few years, the advancement of micromachining technology has facilitated the realization of thermal mass flow sensors fabricated directly on silicon. The micromachining thermal mass flow sensors can offer the benefits of smaller size, lower power consumption, and higher reliability at lower cost compared to the conventional thermal mass flow sensors. In particular with the property of low power dissipation, micromachining thermal mass flow sensors could broaden its exploitation on many battery-operated applications.

The active area for flow sensing element on a conventional micromachining thermal mass flow sensor is typically fabricated on a thin membrane from silicon-based thin films, such as silicon nitride or silicon dioxide materials, which generally have a cavity underneath to provide good heat isolation. Unfortunately, the membrane made of silicon-based thin films is typically very fragile and vulnerable in dirty fluid channels with the existence of smoke or dust. The alien particles or debris in flow channels easily damage the membranes and cause the malfunction of sensors. Such drawbacks have significantly limited the micromachining flow sensor application in many industrial fields. It would, therefore, be desirable to develop a micromachining mass flow sensor which would not only endure the above mentioned problems but still heir the advantages from micro-structure forms.

The U.S. Pat. No. 6,184,773 B1 (Rugged Fluid Flow and Property Microsensor; by Ulrich Bonne et al.) revealed a microfabricated thermal flow sensor consisting of a back-etched honeycomb structures to support the membrane layer for device operation. Although the honeycomb structures provide a solution to improve the strength of suspending membrane, however the underneath honeycomb structure will lessen the thermal isolation of membrane, which could increase the power consumption and degrade the performance of devices. In addition, the membrane area above the space between honeycombs could still become the weakest points on the membrane layer; therefore those areas will possibly become the initial points of membrane breakage.

A microstructure flow sensor die with a Microbrick or microfill structure had been detailed in the U.S. Pat. No. 7,109,842 B1 (Robust Fluid Flow and Property Microsensor Made of Optimal Material; by Aravind Padmanabhan et al.). There are three embodiments revealed in the invention to realize the ideas of robust micro-sensor. The first one is to utilize a solid substrate having low thermal conductivity such as glass substrate. The second one is involving a micro-filling process of poor thermal conductivity material into the micro-cavity underneath the membrane. The third embodiment is to etch the glass substrate underneath the membrane into five circular openings. The above embodiments have various drawbacks such as high power consumption (first embodiment), enormous complexity of process, yield and cost issues (second and third embodiments).

The U.S. Pat. No. 7,040,160 (Flow Sensor; by Hans Artmann et al.) teaches a thermal flow sensor built on a region having poor heat conductivity, which is made of porous silicon or porous silicon dioxide on a silicon substrate. However, in order to attain good thermal isolation for the porous silicon region, the porous silicon layer should have enough thickness and high porosity. Since it is very time consuming and high cost to obtain such porous silicon layer, therefore it greatly reduces the feasibility of mass production. Moreover, to ensure the ambient temperature sensor having good thermal conductivity to the substrate is very crucial to prevent the temperature effect of thermal flow sensor. For the above reason, the ambient temperature sensor should not be disposed on the porous silicon region. Consequently, the porous silicon growth in selective area on silicon substrate becomes crucial to ensure the good performance of flow sensor.

Compared to the above mentioned inventions, the micro-fabricated thermal mass flow sensor in the current invention disclosed will present superior properties in many aspects include easiness of integration and fabrication, better liability, strength of membrane structure, and lower cost of manufacturing.

SUMMARY OF THE INVENTION

Therefore, it would be desirable to provide an apparatus and method whereby the micromachining thermal mass flow sensor could work robustly in a dirty flow fluid without being disrupted for improved work efficiency. This aim is reached by the object of the independent claims.

The present micromachining mass flow sensor device with active membrane made of polyimide materials is capable of providing a strong and sturdy support to the active region of operation. Cured polyimide film is known for its thermal stability, good chemical resistance, and excellent mechanical properties. Furthermore, in the prevent invention, the polyimide film is double-side passivated on its top and bottom surfaces to prevent degeneration from absorbing moisture. Cured polyimide films compounded with graphite or glass fiber reinforcements have flexural strengths of up to 50,000 psi and flexural moduli of 3 million psi. Cured polyimide films exhibit very low creep and high tensile strength. In addition, polyimide films have very low thermal conductivity property ($3.5 \times 10^{-4}$ Cal/cm sec C) after curing, which is about one order lower than silicon dioxide's; therefore it is very suitable as the thermal isolated membrane layer. Another advantage for polyimide films is its easiness to obtain thick films (>5 um). Other conventional silicon-based semiconductor films, such as silicon nitride and silicon dioxide, are very difficult to deposit or grow greater than 3 um in thickness. On the other hand, polyimide film is very easy to obtain films from 5 to 20 um in thickness which is simply depending on the speed of spin-coating. With thick film for the membrane layer, it could assure stronger and more robust membrane structure.

With such desirable characteristics, the sensor chip itself is able to sustain operation at environments filled with alien particles or debris. In addition, the membrane region of such device is robust enough to maintain its cleanness by wiping its surface with tools such as cotton swaps; therefore the sensor could greatly enhance its flow measuring accuracy and retain its repeatability from calibration.

New proprietary silicon micromachining robust thermal mass flow sensors based on the principles of anemometry and calorimetry are developed at the present invention. The thermal flow sensors mainly comprise four serpentine-shape thermistors in the active region of device. One of the thermistors is built as heater thermistor to elevate the temperature of flow medium while another one of the thermistors is functioned as reference thermistor to measure the ambient temperature. In most of cases, the resistance of the reference thermistor is meant several times higher than the heater's resistance, thus to reduce the electrical current passing through the reference thermistor and to avoid the self-heating effect on the reference thermistor. A Wheatstone bridge circuit consisting of the heater and reference thermistors is designed to elevate the heater thermistor to a constant temperature above the ambient temperature.

Two temperature sensing thermistors are respectively disposed on the left and right sides of heater thermistor to sense the temperature distribution of flow medium on downstream and upstream in relative to the heater thermistor. A Wheatstone bridge circuit, in which the downstream and upstream sensing elements comprise two of its four branches, is applied for signal output.

The fluid speed measurement in the present invention is carried by calorimetric theory. Since the moving fluid continuously carries heat away from the heater thermistor thus changes the temperature distribution around the heater thermistor area. The unbalanced temperature distribution will change the resistances on the upstream and downstream temperature sensing thermistors and cause the unbalance in Wheatstone bridge circuit. The output signal fetched from the Wheatstone bridge circuit will be calibrated as the flow speed.

The heater and the upstream/downstream temperature sensing thermistors are all standing on the thermally isolated polyimide film membrane while the reference resistor is solely located on top surface of silicon substrate in order to keep good thermal conductivity to silicon substrate. All the thermistors are encapsulated with a 0.3~0.5 micron thick dielectric film as passivation layer to isolate the moisture and corrosive materials. The cavity underneath the suspending membrane is fabricated by anisotropic etching on silicon substrate.

A variety of materials with high TCR (temperature coefficient of resistance) property such as Pt, Au, SiC, and TaN could be the candidates for thermistors.

BRIEF DESCRIPTIONS OF THE DRAWINGS

FIG. 1 illustrates a preferred sensor topology: top view.

FIG. 2(a) to FIG. 2(e) show a process for forming a robust micromachining thermal mass flow sensor according to the preferred embodiment on the current invention.

DETAILED DESCRIPTION OF THE PREFERRED EMBODIMENTS

FIG. 1 illustrates a top view of preferred sensor topology. The reference thermistor is disposed on the silicon substrate and used to measure the ambient temperature. The reference thermistor and the heater thermistor form a closed-loop heater thermistor control circuit. The control circuit is to keep the heater temperature constantly above the ambient temperature. The temperature sensing thermistors are operated to measure the temperature distribution besides the heater thermistor, which could be calibrated as the flow speed.

From FIG. 2(a) to FIG. 2(e), the figures demonstrate a process for forming a robust micromachining thermal mass flow sensor according to the preferred embodiment of the present invention.

Figure 2:
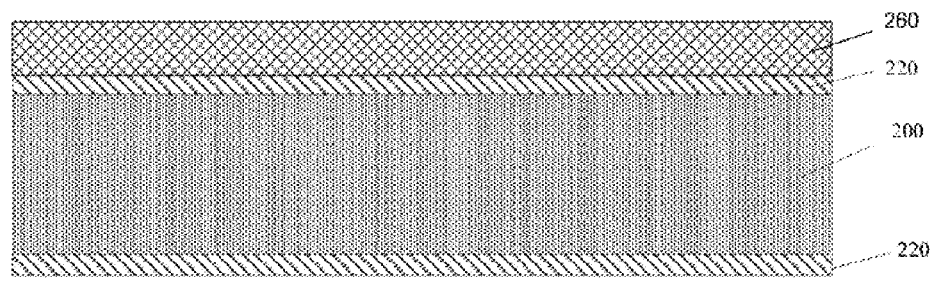
Figure 2:
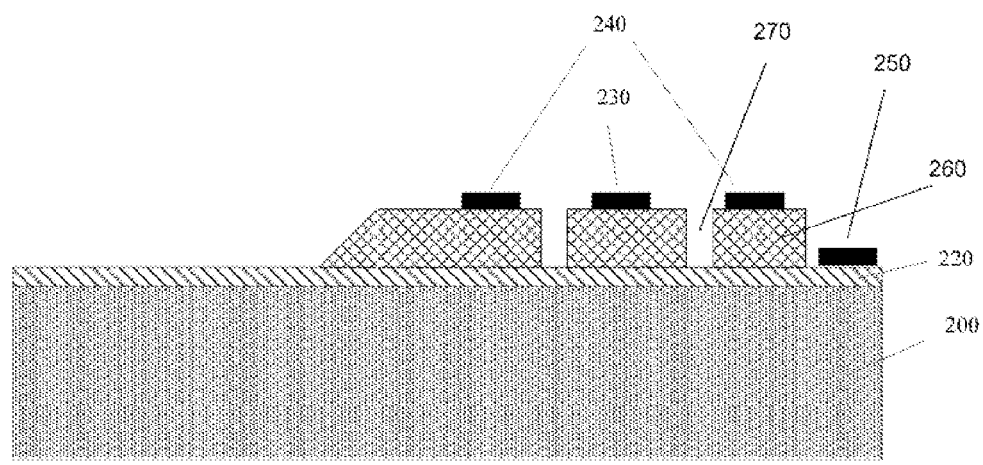
Figure 2:
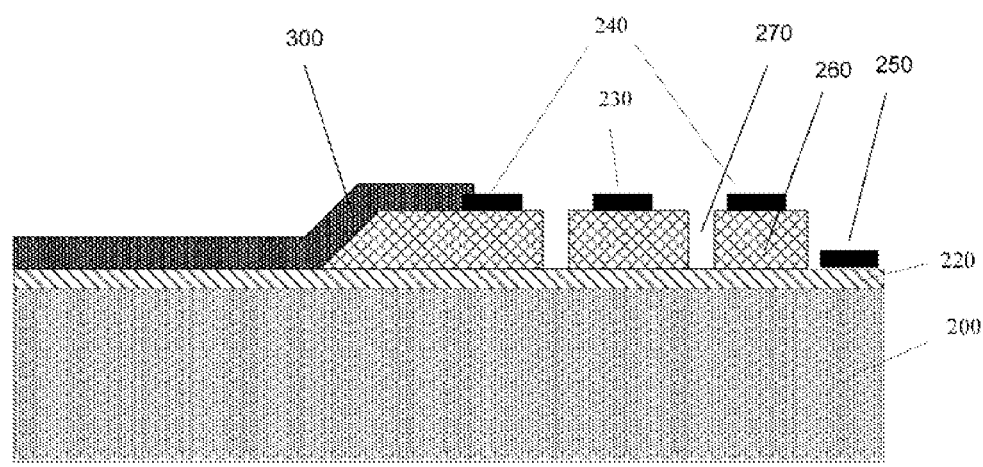
Figure 2:
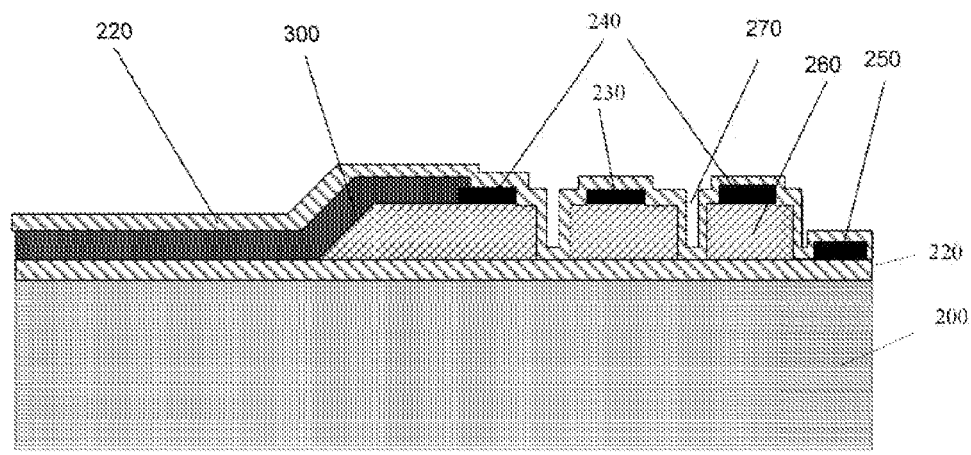
Figure 2:
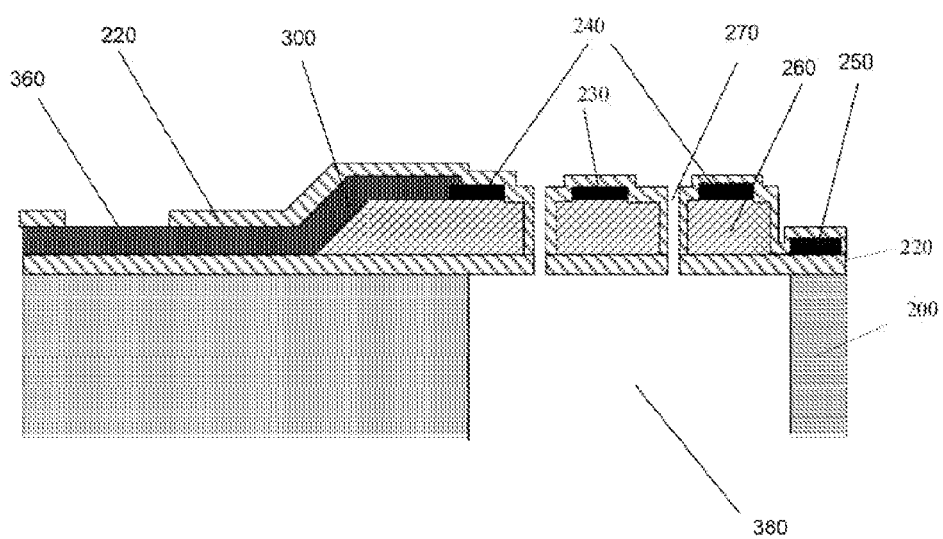

Referring to FIG. 2 (a), low pressure chemical vapor deposition (LPCVD) low stress silicon nitride 220 is deposited on both sides of the silicon substrate 200. Then the front side of wafer is spin-on coated polyimide film 260 with thickness from 2 to 30 um. After curing the polyimide film, the LPCVD silicon nitride on wafer backside is etched away. The LPCVD silicon nitride 220 on the front side of wafer which is underneath the cured polyimide film will function as the passivation layer on the bottom surface of polyimide film.

In FIG. 2(b), after patterning the polyimide film 260 with oxygen plasma, the heater thermistor 230, temperature sensing thermistors 230, and reference thermistor 250 are all formed patterned by lift-off process. It is well known that the surface roughness of polyimide film is extremely little; therefore a process step for roughing the polyimide surface by oxygen plasma is necessary to enhance the adhesion of thermistor materials to the polyimide. Before the deposition of thermistor materials, the polyimide film had been endured an oxygen plasma bombardment for 60 sec at power of 300 watts in a high density inductive-coupled-plasma (ICP) chamber. In addition, an adhesive enhancement layer underneath the thermistor material is incorporated to enhance the adhesion to polyimide surface as well. The typical adhesion enhancement layers are chromium (Cr) and Titanium (Ti).

The preferred thermistor materials are those with high temperature coefficient of resistance (TCR) such as platinum, gold, silicon carbide, and tantalum nitride. Then, in the FIG. 2 (c), a photolithography and etching process is performed to remove portions of the interconnection metal layer 300 and form the interconnection circuit. Subsequently referring to FIG. 2 (d), a dielectric thin film 220 about 0.3 to 0.5 um of plasma enhanced chemical vapor deposition (PECVD) silicon nitride, for the overall processed substrate structure is deposited. The dielectric thin film 220 is applied as a passivation layer to prevent the device from moisture and corrosive materials. However, in order to improve the adhesion of passivation layer to the polyimide surface and the long term reliability, another thin layer of dielectric film (500 to 1000 A), PECVD silicon dioxide layer, is deposited in between as adhesion enhancement layer.

In the FIG. 2 (e), photolithography and plasma etching process are performed to define the opens in the bonding pads. Subsequently, another photolithography process on wafer backside is performed to define the openings for backside bulk etching as shown in the figure. The backside bulk etching on silicon wafer can be achieved by the well know Bosch process in a high density plasma (ICP) deep reactive ion etching (DRIE) chamber. The LPCVD low stress silicon nitride layer 220 underneath the polyimide layer is employed as an etching stop layer for DRIE and as a bottom surface passivation for polyimide layer.

According to the foregoing preferred embodiments, the suspending membrane is to prevent the vertical heat conduction from heater thermistor to the bulk substrate. The open-slots 270 on the membrane are formed to prevent the heat horizontally conducting to the bulk substrate as well. Thus, the device could reduce the power consumption of heater thermistor during device operation.

While the invention has been described in terms of what are presently considered to be the most practical and preferred embodiments, it is to be understood that the invention need not be limited to the disclosed embodiments. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

We claim:

1. A robust micromachined thermal mass flow sensor comprising: a suspending polyimide membrane with double side passivation layers on both top and bottom surfaces of the polyimide membrane which is suspended on a silicon substrate;
   a heating element thermistor being connected to a microcontroller circuit with an ambient temperature sensing thermistor;
   a temperature sensing thermistor being disposed on upstream flow side of the heating element thermistor with an open slot on the suspending polyimide membrane;
   a temperature sensing thermistor being disposed on downstream flow side of the heating element thermistor with an open slot on the suspending membrane;
   wherein the passivation layer on the bottom surface of the polyimide layer contains silicon nitride;
   wherein the ambient temperature sensing thermistor being disposed in a region of no polyimide layer on the silicon substrate; and
   wherein the open slots on the suspending polyimide membrane between the heating element thermistor and the temperature sensing thermistors isolates transverse heat conduction from the heating element thermistor to the temperature sensing thermistors.

2. The robust micromachined thermal mass flow sensor of claim 1 wherein:
   the open slots on the suspending polyimide membrane are disposed in the direction perpendicular to the flow direction wherein the dimension of the open slots are 20 to 40 um wide and 400 to 600 um long.

3. The robust micromachined thermal mass flow sensor of claim 1 wherein:
   the open slots are utilized to balance the pressure difference between flow passage above the suspending membrane and a cavity underneath the suspending membrane, which could increase stability and endurance of the polyimide membrane and enhance sensor accuracy under high pressure operation.

4. The robust micromachined thermal mass flow sensor of claim 1 wherein:
   the ambient temperature sensing thermistor is positioned on an upstream location related to the heating element thermistor;
   wherein the ambient temperature sensing thermistor is at least 500 um away from the heating element thermistor to reduce heating effects from the heating element thermistor.

5. The robust micromachined thermal mass flow sensor of claim 1 wherein: a silicon dioxide layer is applied as an adhesion enhancement layer to improve the long term reliability and the adhesion between the passivation layer and the polyimide layer membrane.

6. The robust micromachined thermal mass flow sensor of claim 5 wherein:
   the thickness of the dielectric silicon dioxide layer is from 500 A to 1000 A; the thickness of the dielectric silicon nitride layer is from 3000 A to 5000 A.

* * * * *